(12) United States Patent
Ma et al.

(10) Patent No.: US 7,944,940 B2
(45) Date of Patent: May 17, 2011

(54) METHOD AND APPARATUS FOR MEDIA ACCESS IN CONTENTION-BASED NETWORKS

(75) Inventors: Xiao-Jun Ma, Beijing (CN); Yong He, Beijing (CN); Zhigang Zhang, Beijing (CN); Huanqiang Zhang, Beijing (CN); Jun Li, Indianapolis, IN (US); Charles Chunaming Wang, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 12/452,161

(22) PCT Filed: Jun. 22, 2007

(86) PCT No.: PCT/US2007/014607
§ 371 (c)(1),
(2), (4) Date: Dec. 17, 2009

(87) PCT Pub. No.: WO2009/002296
PCT Pub. Date: Dec. 31, 2008

(65) Prior Publication Data
US 2010/0135167 A1    Jun. 3, 2010

(51) Int. Cl.
*H04L 12/413* (2006.01)
(52) U.S. Cl. ........................ 370/447; 370/445
(58) Field of Classification Search .............. 370/389, 370/349, 443, 444, 445, 447, 450, 458, 461, 370/462
See application file for complete search history.

(56) References Cited

U.S. PATENT DOCUMENTS

| | | | |
|---|---|---|---|
| 5,784,375 A | | 7/1998 | Kalkunte et al. |
| 5,960,000 A | * | 9/1999 | Ruszczyk et al. ............. 370/447 |
| 6,567,416 B1 | * | 5/2003 | Chuah ........................... 370/418 |
| 2003/0067873 A1 | | 4/2003 | Fuhrmann et al. |
| 2007/0019666 A1 | | 1/2007 | Hirano et al. |

FOREIGN PATENT DOCUMENTS

| | | |
|---|---|---|
| EP | 1199848 | 4/2002 |
| EP | 1292071 | 3/2003 |
| EP | 1296484 | 9/2005 |
| WO | WO 2004/088878 | 10/2004 |

OTHER PUBLICATIONS

Search Report Dated Mar. 20, 2008.

* cited by examiner

*Primary Examiner* — Brenda Pham
(74) *Attorney, Agent, or Firm* — Robert D. Shedd; Joseph J. Opalach; Catherine A. Cooper

(57) ABSTRACT

A method and apparatus are described for gaining access to a communication medium in a contention-based network, including determining a slot count based on a number of stations in the contention-based network, adjusting the slot count, initiating a frame transmission when the slot count reaches a predetermined value and wherein said number of stations and an address queue are adjusted to reflect a priority. Further, a method and apparatus are described for gaining access to a communication medium in a contention-based network, including receiving a slot count based on a number of stations in the contention-based network, adjusting the slot count, initiating a frame transmission when the slot count reaches a predetermined value and wherein said number of stations and an address queue are adjusted to reflect a priority.

12 Claims, 6 Drawing Sheets

US 7,944,940 B2

METHOD AND APPARATUS FOR MEDIA ACCESS IN CONTENTION-BASED NETWORKS

This application claims the benefit, under 35 U.S.C. §365 of International Application PCT/US2007/014607, filed Jun. 22, 2007, which was Published in accordance with PCT Article 21(2) on Dec. 31, 2008 in English.

FIELD OF THE INVENTION

The present invention relates to media access in contention-based networks and in particular gaining access to a communication medium in contention-based networks by reduction or elimination of contention in contention-based networks.

BACKGROUND OF THE INVENTION

The media access control (MAC) layer's primary function is to provide a fair mechanism to control access of shared communication media. However, in a wireless communication media such as IEEE 802.11 WLAN, prior to transmitting a frame, the MAC layer must gain access to the network, which it does through two different access mechanisms: a contention-based mechanism, called the distributed coordination function (DCF) and a centrally controlled access mechanism, called the point coordination function (PCF).

The PCF modes allow the implementation of a quality of service (QoS) mechanism, but it is optional and requires extra interactions in order to negotiate a QoS between the mobile terminal and the access point (AP). The DCF mode, considered as the default mode, does not provide any QoS mechanism. Consequently all stations including the base station AP in a wireless local area network (WLAN) have the same probability of acquiring access to the medium and sending data via the medium. This type of service is referred to as a "best effort".

Three inter-frame space (IFS) intervals defer an IEEE 802.11 station's access to the medium and provide various levels of priority. Each interval defines the duration between the end of the last symbol of the previous frame to the beginning of the first symbol of the next frame. The Short Inter-frame Space (SIFS) provides the highest priority level by allowing some frames to access the medium before others, such as an ACK frame, a Clear-to-Send (CTS) frame, or a fragment of a previous data frame.

Simultaneous transmit attempts from a number of wireless stations lead to collisions in both the downlink and the uplink communication media, since only one transport stream can be transmitted during any one period. The problem is particularly acute during periods of high traffic loads and may render the protocol unstable. The IEEE 802.11 MAC layer uses collision avoidance rather than collision detection in order to simultaneously transmit and receive data. To resolve collisions, subsequent transmission attempts are typically staggered randomly in time using a binary exponential backoff. The DCF uses physical and virtual carrier sense mechanisms (carrier sense multiple access with collision avoidance (CSMA/CA)) with a binary exponential backoff that allows access attempts after sensing the channel for activity.

The backoff procedure for the family of IEEE 802.11 standards was first introduced for the DCF mode as the basic solution for collision avoidance, and further employed by the IEEE 802.11e to solve the problem of internal collisions between enhanced distributed channel access functions (ED-CAFs). In the emerging IEEE 802.11n standard, the backoff procedure is still used as the fundamental approach for supporting distributed access among mobile stations. Currently, almost all commercially available wireless products of the IEEE 802.11 series use DCF/EDCAF as the solution for medium access and thus heavily depend on the backoff mechanism to avoid collisions. As used herein, "/" denotes alternative names for the same or similar components or structures. That is, a "/" can be taken as meaning "or" as used herein.

The principle and operations of the exponential random backoff procedure are similar in both standards. In order to set the background for the present invention, the backoff procedure specified in IEEE 802.11 is described. Before transmitting each frame, a mobile station (including access point (AP)) determines the state of the wireless medium by physical or Virtual carrier sensing, and if busy, the station chooses a random integer uniformly distributed between 0 and the contention window (CW) as the initial value of the slot count for backing off. Once the medium is determined to be idle after a DCF inter-frame space (DIFS) plus the random number of slot count, where the mobile station decreases the slot count by one for each slot time, then the mobile station can transmit. This procedure is suspended if the medium is determined to be busy at any time during backing off. The contention window (CW) increases exponentially upon each unsuccessful transmission attempt. It begins with a minimum value CWmin and increases up to a maximum value CWmax. All parameters related to the backoff procedure, including the slot time, DIPS, CWmin and CWmax, are specified for the physical layer.

FIG. 1 is an exemplary representation of the random backoff procedure described above. A wireless local area network (WLAN) with one access point and three associated mobile stations is considered in this scenario. As used herein, an access point includes bridges, routers and brouters and any other device used by stations to access a network. An AP also acts as an interconnection point between a radio network (wireless network) and a wired local area network (LAN). In FIG. 1, two rounds of medium contention are shown. To start, the access point (AP) transmits a frame. When the transmission concludes, the medium becomes idle. After the medium is determined to be idle without interruption for a period of time equal to DIFS, all stations including the AP start the exponential random backoff procedure to contend for the medium. At this moment each station maintains a slot count for backing off. For the AP that wins the contention in the previous round of contention, its slot count is randomly chosen from contention window [0, CW], while other stations retain their slot count as in the previous round. The slot count is used to determine how long the station has to wait to determine if the medium is busy before it can transmit. As shown in FIG. 1, during the first round of contention, the random number used for the slot count for the AP is 7. The slot count for station 1 is 8. For station 2 the slot count is 5 and for station 3 the slot count is 3. As each time slot elapses and the medium remains idle, all stations decrease their slot count by one respectively. Since station 3 has the smallest backoff slot count (3), station 3 wins the contention after the medium is idle for a period of 3 time slots and station 3 initiates a new frame transmission at the 4$^{th}$ time slot. Note that as of the time station 3 transmits, other stations have decreased their slot count by three. When station 3 completes its transmission, the second round of contention begins and station 3 randomly chooses a value 8 from contention window [0, CW] as its slot count. As in the first round, other stations use their remaining slot count for backing off. Now, the AP has a slot count of 4. Station 1 has a slot count of 5. Station 2 has a slot count of 2 and station 3 has a slot count of 8. In this round of contention, station 2 has the shortest slot count so it wins and transmits a frame after the DIFS period plus two slot times. This procedure repeats throughout the lifetime of the network.

A major deficiency of the random backoff procedure lies in that, the randomly chosen value of the slot count may degenerate the utility of the medium and thus degrade the performance of carrier sense multiple access (CSMA) technique. Two factors may cause the degeneration. First, as specified in the standard, the station with the smallest backoff time (slot count) is the winner to access the medium, thus a period when the medium is idle exists before next transmission. The existence of such a vacancy between successive frame transactions negatively influences the efficiency of the backoff procedure. The second factor is the possibility of collisions among multiple stations. Though it is greatly relieved by the adoption of randomization during selection of the backoff slots, its negative impact on the network performance can still not be neglected, particularly when the number of contending stations is large.

Another deficiency of the random backoff procedure is the lack of fairness among the stations. The method that doubles the contention window upon unsuccessful transmission may put a station at a disadvantage during the next contention interval/period, as it inclines to choose a slot count larger than its counterparts. Such a binary, exponentially doubled backoff procedure severely defers access to the medium, and may lead to the bandwidth starvation in some cases. Experience has shown that the difference of throughput of stations within the same network may reach 30% of the average.

Many backoff schemes have been proposed to overcome these issues. In one prior art backoff scheme, a multiplicative increase and linear decrease (MILD) algorithm was introduced to change the backoff contention window in a moderate way, and thus improve the fairness. In another prior art scheme, to achieve increased fairness among stations, the contention window is changed dynamically with the estimated fair share of channel assigned to each station. In yet another prior art scheme, a general mechanism is presented for translating a given-fairness model into a corresponding contention resolution scheme. A backoff algorithm that achieves proportional fairness is derived using the contention resolution scheme. In yet another prior at scheme, the probability distribution of slot selection is considered, and an exponential random walking backoff algorithm is proposed in which the backoff slot count decrements with a predetermined probability. In yet another media access scheme, time slots are assigned to each station, where the number of time slots is at least as great as the number of stations in the network. This scheme essentially replaces a contention-based frequency division scheme, such as CSMA, by a time division multiple access scheme where time slots are assigned to each station. A great deal of research has been done in the area of backoff algorithms, fairness and quality of service remain largely unresolved.

Thus, it would be advantageous to have a solution to the fairness and quality of service issues of the random backoff procedures specified by the IEEE 802.11 standards.

SUMMARY OF THE INVENTION

Described herein is a new backoff method that seeks to improve the performance of the legacy random backoff procedure. The method of the present invention adopts a different approach to resolve external collisions. Deterministic values are selected for the backoff slot counts. Thus, there is no duplication among distributed slot counts and each station can exclusively access the medium without colliding with others. By cycling the slot count though a fixed interval [0, N], where N is the number of stations in the network, the method of the present invention offers a round robin type service among the stations. Therefore, the method of the present invention provides guaranteed fairness for the network, and furthermore analysis has shown that the method has high network efficiency for moderate to heavy traffic loads. The round robin type service cycling through the N stations amounts to scheduling stations such that each station receives a fair amount of time. The stations of the present invention can be mobile or fixed and the network can be wired line or wireless. The present invention is directed to any contention-based network where the station uses a physical or virtual carrier sense mechanism to determine if the network is busy. This would include any networks whose MAC layer protocol builds on CSMA, such as cable networks. However, the station may also be stationary and the network can be any contention-based network.

A major feature of the method of the present invention is that, under saturated traffic scenarios, the time interval/period between successive frame exchange sequences initiated by two separate stations is only one DIFS plus one slot time. Such an inter-space time interval/period is shorter than that of conventional random backoff methods used by DCF/EDCA (Enhanced Distributed Channel Access), but longer than the Point Coordination Function (PCF) time interval/period that is used by the PCF/HCCA (HCF Controlled Channel Access) mechanism. Moreover, the method of the present invention regulates a sequential service order among the stations, while conventional random backoff methods do not have such a feature.

Network collisions are an annoying issue for the CSMA based wireless communications, as collisions greatly degenerate network performance, particularly in terms of throughput and network efficiency. However, collisions are eliminated (or greatly reduced) in the deterministic backoff (communication medium access) method of the present invention. Each station can exclusively take control of the wireless medium after its slot count reaches zero. In this sense, the deterministic backoff method of the present invention outperforms legacy random backoff methods.

A method and apparatus are described for gaining access to a communication medium in a contention-based network, including determining a slot count based on a number of stations in the contention-based network, adjusting the slot count, initiating a frame transmission when the slot count reaches a predetermined value and wherein said number of stations and an address queue are adjusted to reflect a priority. Further, a method and apparatus are described for gaining access to a communication medium in a contention-based network, including receiving a slot count based on a number of stations in the contention-based network; adjusting the slot count, initiating a frame transmission when the slot count reaches a predetermined value and wherein said number of stations and an address queue are adjusted to reflect a priority.

BRIEF DESCRIPTION OF THE DRAWINGS

The present invention is best understood from the following detailed description when read in conjunction with the accompanying drawings. The drawings include the following figures briefly described below where like-numbers on the figures represent similar elements.

DETAILED DESCRIPTION OF THE PREFERRED EMBODIMENTS

Figure 1:
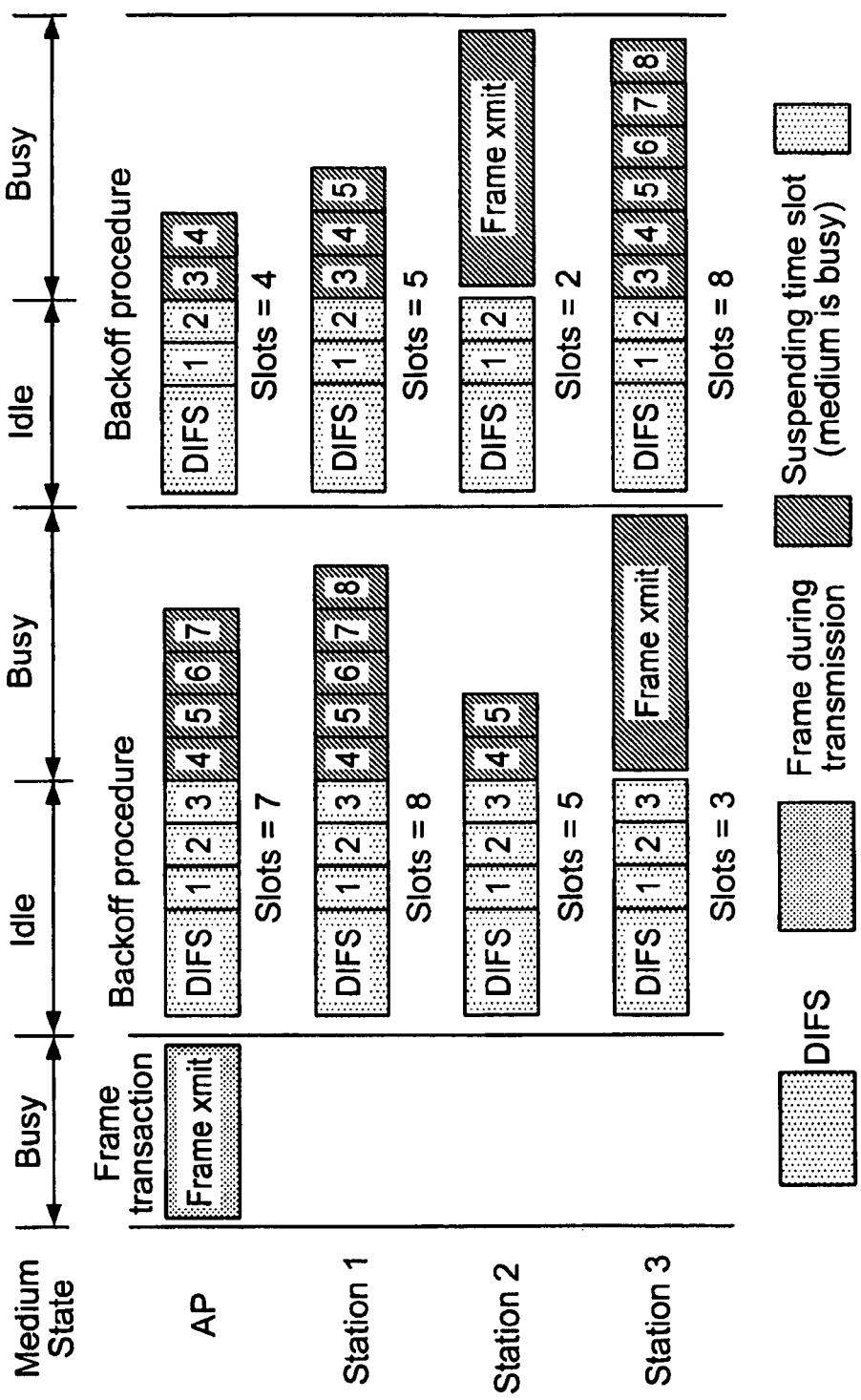
FIG. 1 is an exemplary illustration of the results of applying the conventional random backoff procedure employed by DCF and EDCAF.

The prior art random backoff mechanism, including its subsequent variants, relies on the randomness when choosing the initial backoff slot count (shortened as initial count below) during each round of contention. As each station chooses its initial counter independently, the probability for any two or more of the station to have an identical slot count concurrently is low. The actual value may depend on the number of contending stations, the contention window (CW) used and the distribution function of the initial count. In most cases, the CW is much larger than the number of contending stations, thus low probability of potential collision can be expected for each attempted transmission. The random backoff mechanism is based on this low probability of collision.

The present invention resolves the issue of network collision using an entirely different method. Observing that the main cause of collisions is the overlapped slot count used by multiple stations, the method of the present invention selects the initial count in a more predictable or deterministic way. The method of the present invention uses unique information for each station to derive its initial count, and the method guarantees that at any slot time, each station holds a slot count that is unique for the network. Thus, exclusive medium access can be achieved for each attempt. As the method of the present invention selects the initial count in a deterministic way, it is denominated herein deterministic backoff.

In the deterministic backoff method of the present invention, each station decrements its slot, count whenever the medium has been sensed to be idle for a DIFS time. When the slot count reaches zero, a station starts transmitting, for example, in a wireless network over the air. These operations are similar to that of the conventional random backoff mechanism. Discrepancies appear when a mobile station needs to choose an initial count for backing off upon conclusion of a frame exchange or a transmission failure. For the deterministic backoff method of the present invention, the initial count is chosen based on the global unique information of the network—the number of stations and to avoid overlapping with the slot counts of other stations. The method used by the conventional random backoff that doubles the size of the contention window upon collision or failure is replaced by the round robin service of the present invention, in which the slot count cycles through a fixed interval [0, N], with N being an integer equal to the number of stations in the network (including the AP). The round robin service of the present invention operates throughout the entire service period. Once the slot count reaches zero, a station gets an opportunity to initiate a frame exchange sequence. Afterwards, the slot count restarts with a value of N. The slot count should be set to an initial value during the station's first attempt to access the medium and adjusted adaptively as the network evolves. Besides, considering that there is a possibility of temporal non-synchronization of slot time among multiple stations and the clear channel assessment (CCA) error, a slot count calibration procedure is adopted in the present invention.

Figure 2:
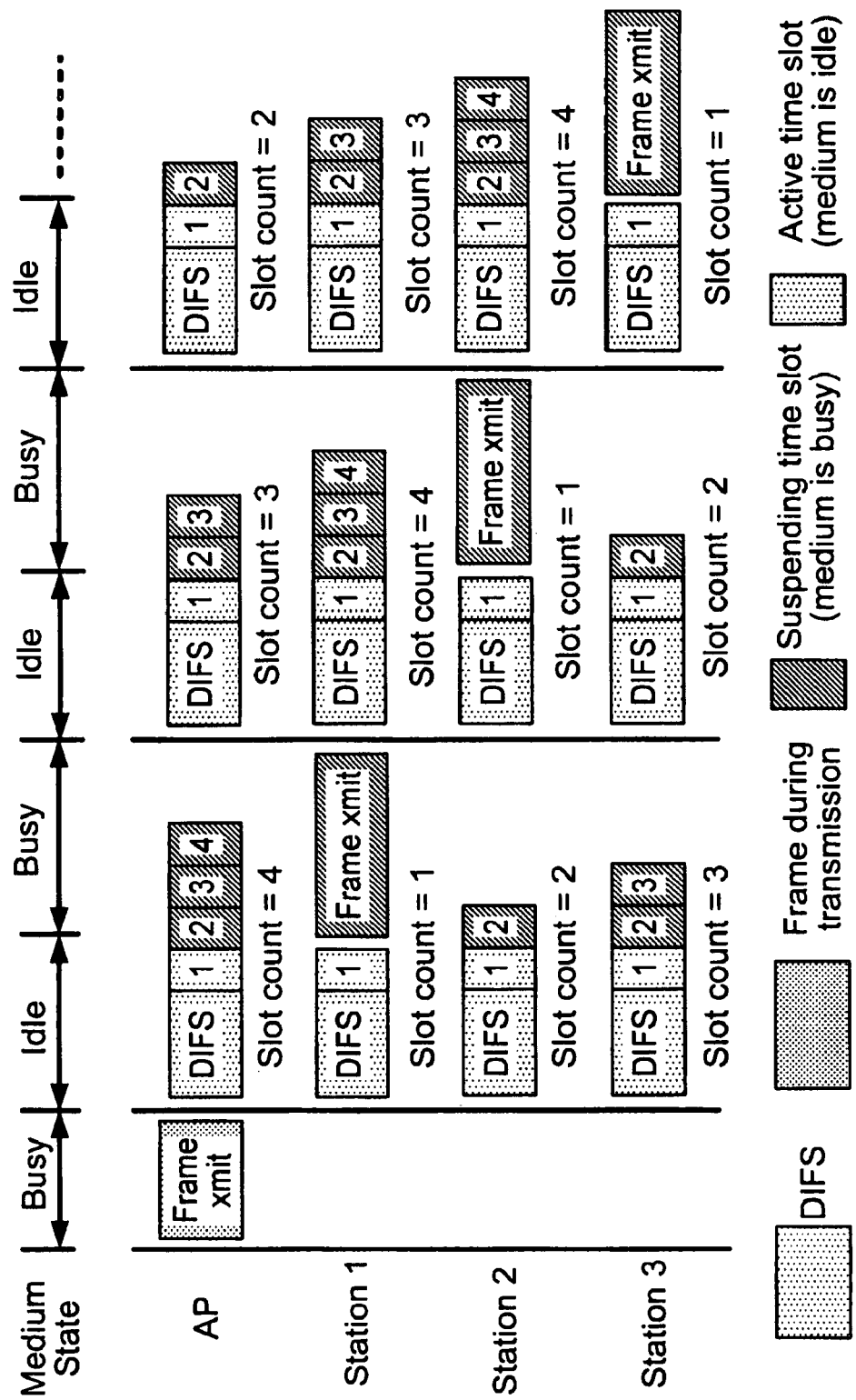
FIG. 2 is an exemplary illustration of the results of applying the deterministic backoff mechanism of the present invention.

FIG. 2 is an exemplary illustration of the deterministic backoff mechanism of the present invention. A wireless LAN with one AP and three mobile stations is considered in this example. As shown in the figure, each station maintains a slot count that cycles through 0 to 4, and whenever it reaches 0, a frame transmission commences, followed by resetting the slot count to 4. For each round of backing off, there is always one station that will be served after a period of a DIFS and one slot time. Thus like the token ring networks, the opportunity of gaining control of the wireless medium circulates among these stations, in a predefined sequence. As for the example in FIG. 2, the serving order is AP→STA 1→STA 2→STA 3→AP, and the intermediate time space between successive serving opportunities is a DIFS plus one slot time, a substantially shorter time compared to conventional random backoff methods.

Referring still to FIG. 2, after the AP transmitted a frame, it resets its slot count to four, which is the maximum number of stations (N) in this case. When the next round of contention begins, all stations including the AP decrease their slot counts by one after the medium is sensed to be idle for a DIPS time. Because STA 1 has the smallest slot count (one), it wins the contention and gets the opportunity to transmit a frame after a slot time elapses and slot count reaches zero. Other stations suspend decreasing their slot count during the transmission by STA 1. Once STA 1 concludes its transmission, it resets its slot count to four and a new round of backoff begins. This continues in this manner for the life of the network with each station getting a turn to transmit in order. Should a new station wish to associate with the network, the slot count is increased by one by the AP and distributed by the AP to each currently associated station and to the new station in a field of the management frame or piggybacked onto the association response. Note that the slot count distribution procedure should be conducted immediately in a SIFS period after the conclusion of the association procedure to prevent other stations decrementing their slot count in the middle of the two procedures.

In the view of an individual station, the entire procedure of deterministic backoff can be described using two parameters: the initial slot count for a station to access the network for the first time as a new member of the network, denoted as $C_0$, and the slot count for a station to start a new round of backing off, denoted as $C_1$. The slot count is set to $C_0$ immediately after the association procedure, working as a starting point for a station to access the medium. $C_0$ will not be used thereafter by the station. The value of $C_0$ should be chosen carefully to avoid overlapping slot counts among stations. The parameter $C_1$ is used to reset the slot count for round robin service throughout a station's lifetime in a network. All stations in the same network share the same value of $C_1$. Both the $C_0$ and $C_1$ should be determined during the association procedure of a new station, and $C_1$ should be adjusted as the network evolves.

The AP and stations play different roles in the deterministic backoff procedure of the present invention. The AP assumes the responsibility for selecting appropriate value for $C_0$ and $C_1$, and for distributing its choice to the network. Whereas, each station is an executor performing the deterministic backoff procedure of the present invention using parameter settings selected by the AP. Hence, the AP works as a scheduler and coordinator during the deterministic backoff procedure of the present invention and all stations operate then as dispatchers. It should also be able to resolve network collisions by negotiating with the stations to adjust their slot counts.

In the method of the present invention, the value of $C_1$ is set to the number of stations (N) existing in the network, including the newly associated station and the AP.

$$C_1 = N \quad (1)$$

Figure 3:
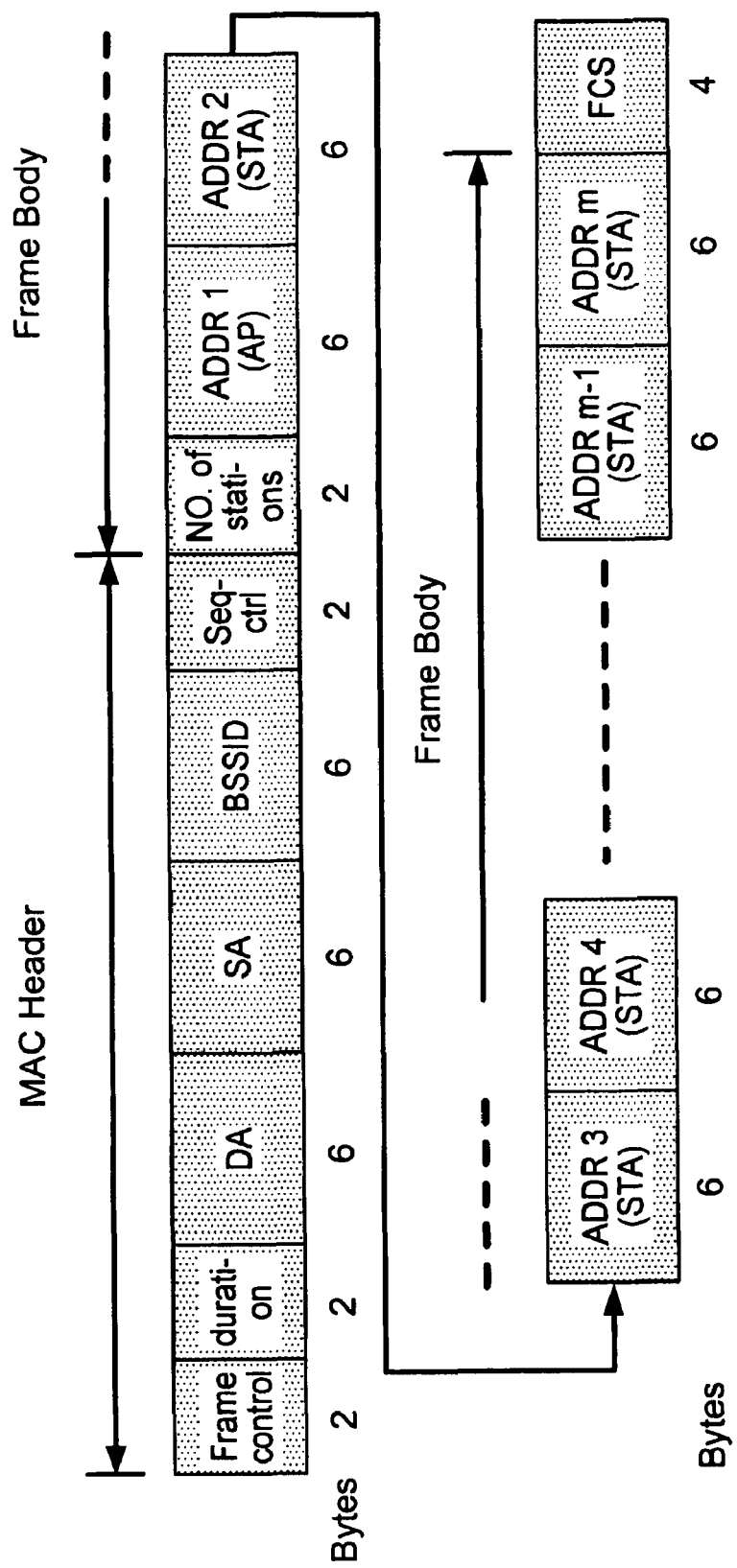
FIG. 3 illustrates an embodiment of the format of the management frame in accordance with the principles of the present invention.

The value of $C_0$ is set to a value that is not currently used by any station in the network. The method of the present invention ensures that the collection of all the slot counts in use in the network should be a set with its member counting from 1 to the total number of stations. In this case, before a notification message of a successful association (such as an association response with status successful, or a new management frame as shown in FIG. 3) is announced, all other stations still maintain the number of stations as (N–1), and its slot count should be an integer between 1 and (N–1). Thus a reasonable choice of the initial slot count $C_0$ for the newly joined station is using the updated station number N, which avoids overlapping with the currently used slot count and still preserves the continuity for the allocated slot counts. That is, $$C_0 = N \quad (2)$$

where N is the number of all the stations (AP and clients), including the client which was newly associated to the network. Equations (1) and (2) are aimed at setting the initial counts for a station that newly joins the network. Obviously both parameters ($C_0$ and $C_1$) can be set by delivering just one value: the number of the stations in the network. A message containing the number of stations can be piggybacked with the association response or be carried as a field in a management frame shown in FIG. 3.

Although in equation (1) the value of $C_1$ is set to the number of stations in the network, it still can be set to any other value higher than the number of stations in the network, which may result in lighter management overhead. In that case, the average backing off time increases, in an approximately linear relationship with $C_1$. However, in an alternative embodiment of the present invention, this may be employed to provide prioritized services among stations. For example, a simple priority scheme could be implemented wherein a station with a higher priority could be inserted multiple times in an address queue greater than N. For example, one station may have priority level three, meaning that the station address could be inserted into the address queue three times. Thus, that station would have three chances to transmit during any round of backoff periods. Another station may have priority level two, meaning that the station address could be inserted into the address queue two times. Thus, that station would have two chances to transmit during any round of backoff periods. While this embodiment reduces somewhat the overall fairness, it may be necessary or advantageous depending on the type of traffic/data or the criticality of the traffic/data being transmitted.

Note that in some situations where the number of stations in the network is large but the only a small portion of them have data to send, it may not be an efficient approach to set the value of $C_0$ and $C_1$ equal to the number of stations as in equations (1) and (2). For example, consider a wireless local area network with one AP and as many as 30 associated mobile stations. It is probably that the AP is the only sender in the network most of the time. In this case, each time the AP has to wait for a period of 30 consecutive time slots before it can access the channel, which degrades the AP's and the network's performance compared to the conventional exponential random backoff method. Therefore, in an alternative embodiment, the values of $C_0$ and $C_1$ may be adjusted to a number smaller than the number of stations in the network. This can be achieved by letting more than one station with little uplink traffic share the same slot count. Each time the transmission opportunity comes (that is, slot count comes down to zero), each of these stations can take actions complying with either of the following rules:

1) A station can transmit its frame with a predefined probability of collision p.
2) A station can adopt a mechanism similar to the conventional exponential random backoff method to determine whether to transmit at this opportunity. That is, the station initiates a counter and decrements the counter upon each transmission opportunity belonging to itself. If the counter reaches zero, the station decides to transmit, otherwise that station forgoes the transmission opportunity.
3) Stations sharing a slot may be given the opportunity deterministically to initiate a frames transmission once every $1/N_{ss}$ slots, where $N_{ss}$ is the number of station sharing a given slot. This would theoretically result in no collisions but delay transmission opportunities for those stations sharing slots.

In this embodiment with rules 1 and 2 above, there is a probability of collisions among the stations that share the same slot count. But the advantage is that this alternative embodiment may increase the channel utility if appropriately used. Note that this alternative embodiment requires changes in the address queue. Moreover, the AP should explicitly inform those stations that are sharing slot count with others by transporting a management frame to them or piggybacking the information onto data or control frames.

In the deterministic backoff method of the present invention, a station has to register itself with the AP and obtain the values for $C_0$ and $C_1$ prior to starting the deterministic backoff procedure. In other words, a station cannot use the deterministic backoff method of the present invention to access the medium before there is a successful association. In fact, an inappropriate method employed by an unassociated mobile station to access the medium, such as conventional random backoff, may corrupt the ongoing deterministic backoff procedure, because the unintended chosen slot count may overlap with others and consequently cause collisions.

This challenge is overcome by letting an unassociated station choose a static deferring time, DIFS, to access the medium during the joining procedure. Note that equation (2) guarantees that, those associated stations have to wait for at least a period/interval of DIFS plus one slot time before gaining control of the medium. Thus, the setting of deferring a DIFS time shorter than that used by these associated stations ensures that the transmission by an unassociated mobile station will not cause collisions within the ongoing backoff procedure.

However, a new issue arises if multiple unassociated stations access the medium simultaneously, which results in collisions among them. To solve this problem, before each attempt to transmit the join requests, each unassociated station is permitted to choose a random value from an interval [0, JoinTimeOut] as the time for backing off. Once such a period has elapsed, the station can attempt to access the medium after the medium has been idle for a DIFS time. In actual practice, the possibility of two or more stations joining the network simultaneously is fairly low. Most stations can successfully access the medium in their first attempt.

It should be noted, that the PIFS (point inter-frame space) interface is not used here, because it is reserved for the AP to conduct point coordination function (PCF)/hybrid coordination function (HCF) controlled channel access (HCCA) operations or for other emergency cases.

The issue of adjusting the slot count arises with the dynamics of the wireless networks. During the lifetime of a wireless network, some mobile stations may join the network at one time, and some may leave at another time. In this situation, the number of associated mobile stations varies with time. In accordance with the principles of the present invention, the (re)setting of the backoff slot counter builds on the global information—the number of stations—of the network so it is necessary to adjust the setting adaptively according to the network dynamics.

Each station should maintain information necessary for adjusting the slot count during the dynamic evolution of the wireless network. First, a variable ($N_i$) in each station holds a number representing the number of stations in the network. Its value is used to derive the value of $C_0/C_1$ using equation (1) and (2). Each station updates the value of this variable when a station joins or leaves the network, by sniffing the association/disassociation messages or by receiving a management frame broadcast by the AP with its format shown in FIG. 3. Once updated all stations should hold the same value of $N_i$. Second, a station should maintain an address sequence that records the order of the round robin service. Each address corresponds to one station. And the relative position of addresses in the sequence indicates the serving order for these stations. Stations whose addresses are neighboring in the sequence should be served successively with a time interval/period of one DIFS plus one slot time. This sequencing service mechanism is achieved by setting these slot counts in compliance with the address sequence. In an alternative embodiment described above that includes a simple priority scheme, $N_i$ would be greater than the number of stations and some stations (with higher priority) would appear in the address queue more than once. In a priority scheme each station may be assigned a priority (station priority scheme) or the priority could be assigned based on the priority of the data/traffic that a station needs or wants to transmit so a station's priority dynamically changes over time (traffic priority scheme). In the traffic priority scheme, the address queue would change each time the traffic priority changed.

Each station, including the AP, shares these two pieces of information (the number of stations and the address sequence of the stations) during the life cycle of the network. Many approaches can be employed to achieve this goal. For example, they can be collected by constantly monitoring the wireless medium and the network activities of other mobile stations. Such a passive eavesdropping technique is easy and simple but lacks reliability. In accordance with the principles of the present invention, the AP provides these pieces of information directly to the network through broadcasting such information in management frame. Each time an event, such as a mobile station joining or leaving the network occurs, the AP transmits an additional frame containing the needed information in a Short inter-frame spade (SIFS) time period/interval after the (dis)association exchange. That is, this new frame can be viewed as the last frame within the (dis)association exchange sequence.

Such an exemplary management frame is shown in FIG. 3 where the frame body includes the number of stations and the address sequence. It should be remembered that an alternative embodiment having a simple priority scheme would have a number of stations ($N_i$) greater than the actual number of stations and the address sequence may include the same station(s) multiple times.

Thus, the (dis)association procedure can be described as follows. Whenever the AP receives a (dis)association request frame, the AP first responds with a (dis)association frame. Then a SIFS time period/interval later after receiving an ACK, the AP broadcasts a new management frame to the network, carrying the following information: 1) the number of stations in the network and 2) the address sequence. Mobile stations receiving this frame should update their stored information.

It is possible that this announcement message may not be correctly received by some stations, which could lead to disagreement of maintained information among stations. In this case, the AP can 1) explicitly inform each station of the information by initiating reliable unicast session or 2) periodically announce the information in the beacon messages. Other approaches that provide reliable delivery of information can also be applied.

The address sequence can serve as a basis for a mobile station to calibrate the slot count, given that it can capture the frames in the air. As an instance, when station j has concluded its transmission and at least one frame of this transaction has been captured by station i, then station i can use the address sequence to recalculate its slot count slot(i) using the following equation:

$$\text{slot}(i) = (\text{seq}(i) - \text{seq}(j)) \bmod (C_1) \quad (3)$$

where seq(i) and seq(j) denote the relative position (named sequence number) of the addresses of station i and j in the address sequence respectively. Since the AP is always present in the network, its address is first and it gets address sequence number 1.

Using equation (3), a station can calibrate its slot count at each conclusion of a frame exchange. Intrinsic characteristics of a shared wireless medium facilitate the calibration procedure, as a frame in the air can be sensed by all interfaces sharing the medium. Moreover, the calibration procedure can be used to resolve collisions that are caused by controlled channel access (CCA) error or obsolete NAV (network allocation vector) updates. For example, if the data frames of two mobile stations collide at one slot time, then before the next round of service for them, both stations can recalculate their slot count using the calibration procedure to avoid further collisions.

Each station decrements its slot count after the medium has been sensed and determined to be idle for a DIFS time period/interval, even in the case that it does not intend sending any data. The slot count cycles through $C_1$ to 0 ceaselessly for a station's lifetime. Every time the sot count reaches zero, the station initiates a new frame exchange sequence, or does nothing, both followed by a new round of slot counting. This mechanism is introduced to preserve the mutual relationship between these distributed slot counts within the network's operating procedure.

Figure 4A:
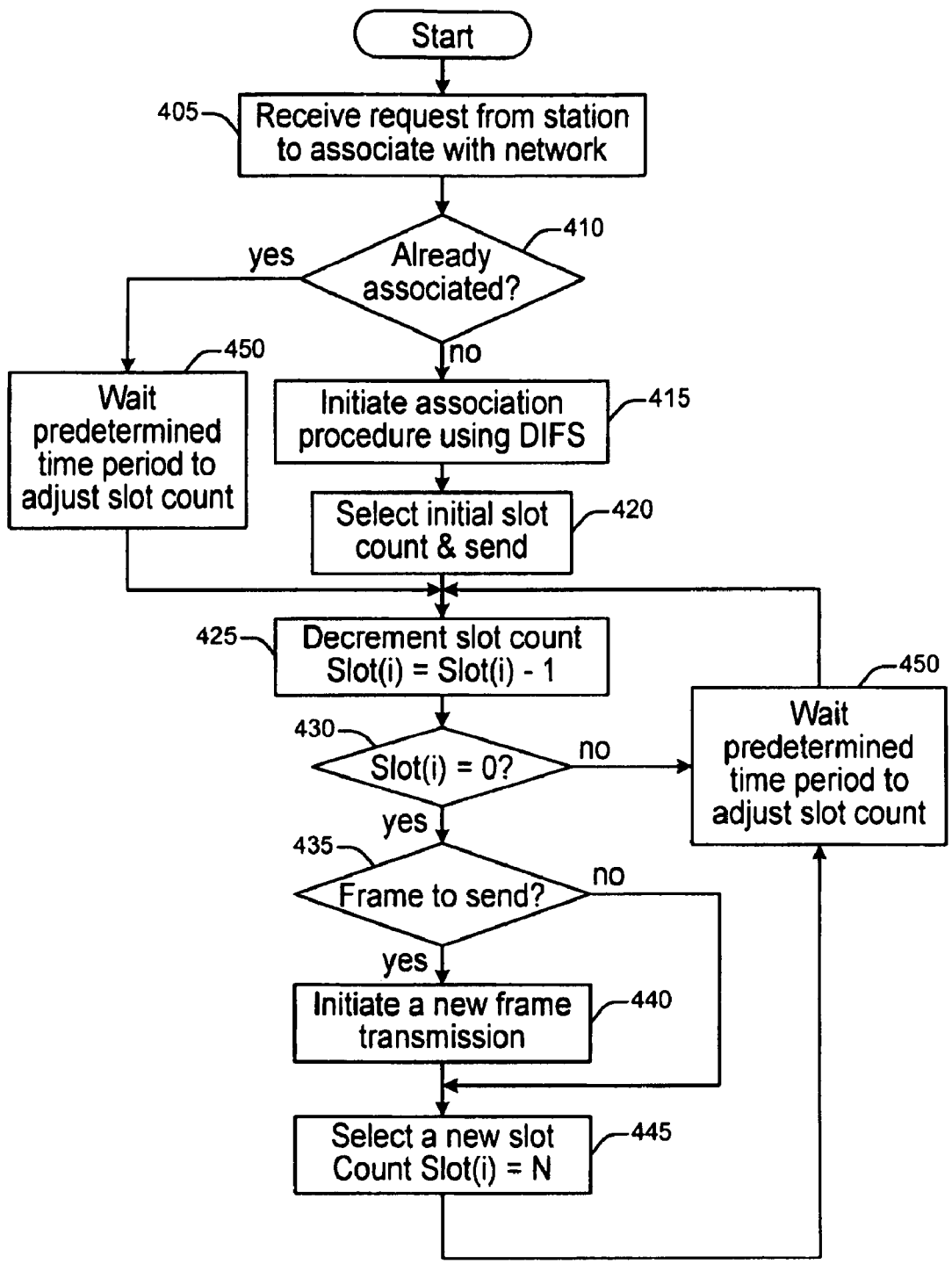
FIG. 4a is a flowchart of the operation of the deterministic backoff method of the present invention from the perspective of the access point.
Figure 4B:
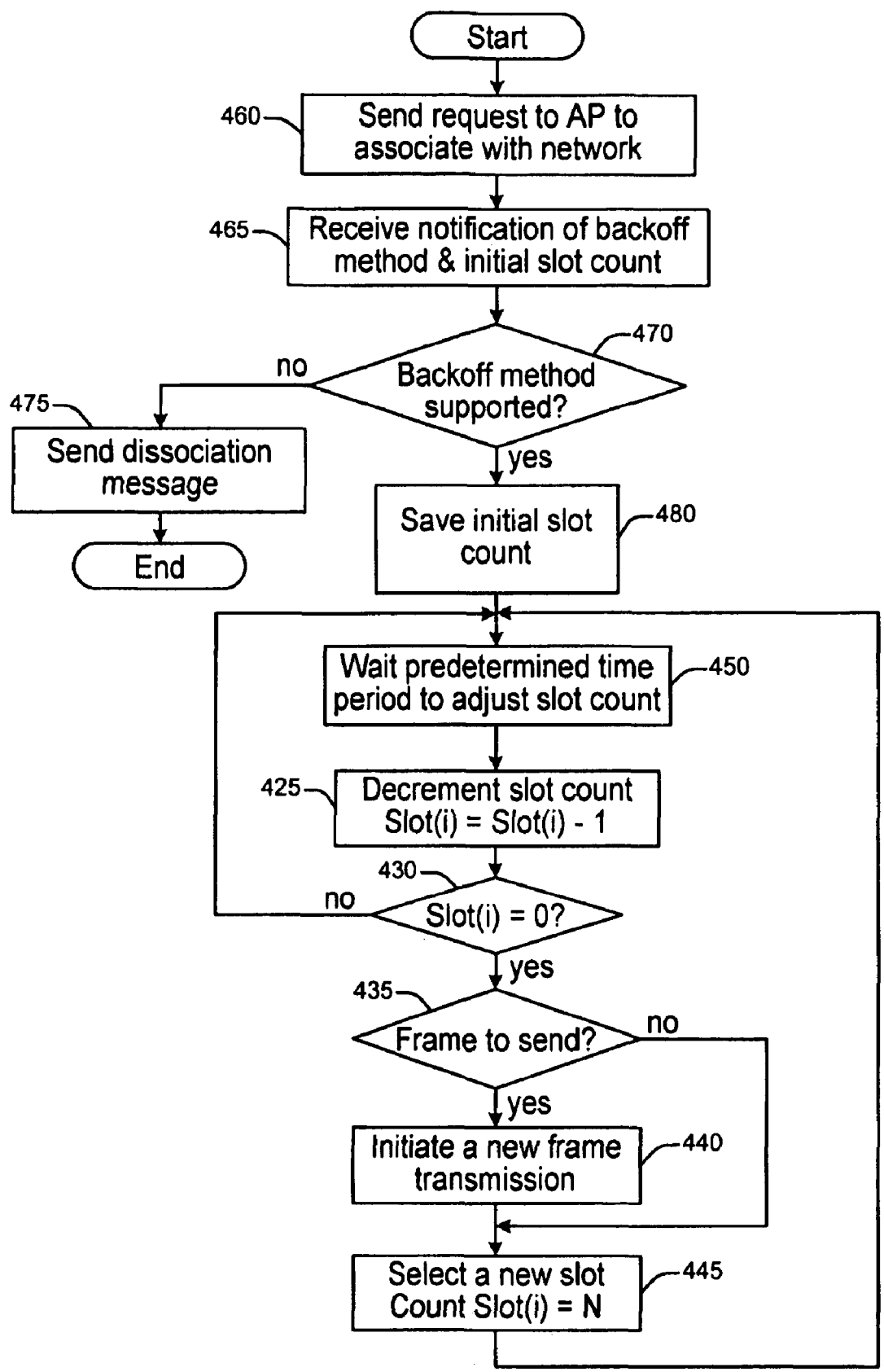
FIG. 4b is a flowchart of the operation of the deterministic backoff method of the present invention from the perspective of the station.

FIGS. 4a and 4b are flowcharts showing the operation of the deterministic backoff method of the present invention. An unassociated station should first perform an association procedure to join the network using the reserved DIFS time interval. The AP informs the new station of its use of a deterministic backoff method and of the initial slot count during this exchange. At this point, the station determines if it wishes to become a member of the network considering the backoff method. The station may be a legacy station that is unable to support the deterministic backoff method of the present invention. Once the station becomes a member of the network (joins the network or becomes associated with the network), the station cycles its slot count through N to 0, where N is at least the number of stations in the network. Normally, N is the number of stations in the network but as described above, N may advantageously be greater than the number of stations in the network for alternative embodiments described above. Each time the slot count reaches 0, the station gets an opportunity to initiate a frame transmission. Moreover, the station adjusts its slot count after waiting a predetermined period of time and based on information of the serving order among stations throughout the lifetime of the station within the network.

FIG. 4a is a flowchart of the operation of the deterministic backoff method of the present invention form the perspective of the access point. At 405 the AP receives a request from a station to become a member of (join or become associated with) the network. The AP checks at 410 to determine if the station is already associated with (a member of) the network. If the joining station is not already a member of the network then at 420 the AP sends the joining station an initial slot count, the communications medium access method used by the network, the number of stations in the network and the address queue. The AP then waits to receive either an acknowledgment from the joining station or a dissociation message from the station. A dissociation message would be sent, for example, if the joining station was a legacy station that could not support the communication medium access method of the present invention. If the joining station is already associated with the network then the AP waits a predetermined time period at 450. The slot count is adjusted at 425. In an exemplary embodiment the slot count is decremented by one. An adjustment that is incremented could also be used. The slot count is compared to a predetermined value at 430. The exemplary embodiment of FIG. 4A compares the adjusted (decremented) slot count to 0. If the slot count has reached the predetermined value then at 435 the AP determines if the AP has a data frame to transmit. If the AP has a data frame to transmit then data frame transmission is initiated at 440. If the AP does not have a data frame to transmit then the AP skips its turn and selects a new slot count at 445. Once data frame transmission has been initiated then the AP selects a new slot count at 445. If the slot count had not reached the predetermined value at 430, then the AP waits a predetermined time period at 450. Of course, if the AP has not received a new request to join the network then 405, 410, 415, 420 and 450 are skipped/not executed.

FIG. 4b is a flowchart of the operation of the deterministic backoff method of the present invention form the perspective of the station. At 460 the joining station sends a request to join the network to the AP. The joining station then waits until it receives the communications medium access (deterministic backoff) method from the AP, as well as the slot count, the number of stations in the network and the address queue at 465. At 470, the joining station determines if it supports the communication medium access (deterministic backoff) method used by the network. If the joining station determines that it supports the communication medium access method then it saves the slot count, the address queue and the number of stations in the network at 480. The station proceeds as described above to gain access to the communication medium in accordance with the principles of the present invention. If the joining station determines that is does not support the communication medium access method of the present invention then it sends the PA a dissociation message at 475. Of course, if the joining station is already a member of (associated with) the network then 460, 465, 470, 475 and 480 are skipped/not executed.

Figure 5A:
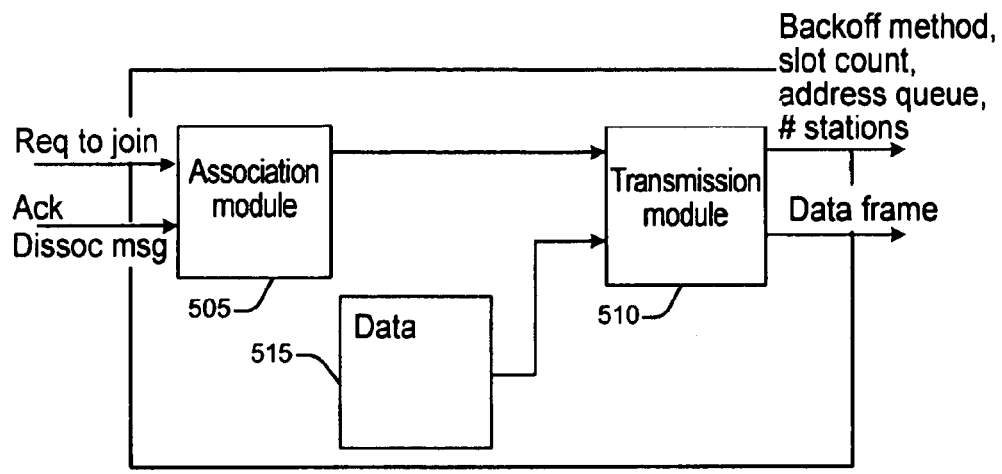
FIG. 5a is a schematic/block diagram of the operation of an AP in gaining access to a communication medium in a contention-based network in accordance with the principles of the present invention.

FIG. 5a is a schematic/block diagram of the operation of an AP in gaining access to a communication medium in a contention-based network in accordance with the principles of the present invention. Association module 505 receives any requests to join and any acknowledgments or dissociation messages from stations. The association module performs any operations relating to a station joining (becoming a member of) the network and sends out any messages relating to a station joining the network via transmission module 510, which handles transmission of any messages associated with a station joining the network as well as any data the AP has to transmit once the AP gains access to the communication medium. The transmission module also handles any encoding, encryption and modulation. The data module 515 handles preparing any data that the AP wants/needs to transmit via the transmission module. The above description is of an exemplary embodiment and the modules may in fact, be combined into a single module or further subdivided into additional modules such as an encoder, encrypter, modulator.

Figure 5B:
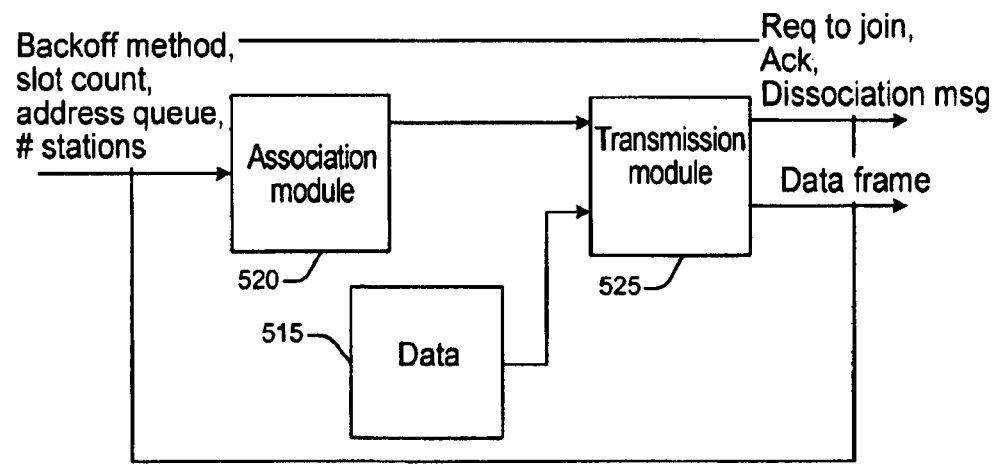
FIG. 5b is a schematic/block diagram of the operation of a station in gaining access to a communication medium in a contention-based network in accordance with the principles of the present invention.

FIG. 5b is a schematic/block diagram of the operation of a station in gaining access to a communication medium in a contention-based network in accordance with the principles of the present invention. Association module 520 sends a request to join the network and receives an indication of the communication medium access method, the slot count, the number of stations in the network and the address queue from the AP. The association module further determines if the joining station supports the communication access method then it sends the AP an acknowledgment message. If the joining station does not support the communication access method then it sends the AP a dissociation message in order to dis-associate from the network. That is, the association module performs any operations relating to a station joining (becoming a member of) the network and sends out any messages relating to a station joining the network via transmission module 525, which handles transmission of any messages associated with a station joining the network as well as any data the station has to transmit once the station gains access to the communication medium. The transmission module also handles any encoding, encryption and modulation. The data module 515 handles preparing any data that the AP wants/needs to transmit via the transmission module. The above description is of an exemplary embodiment and the modules may in fact, be combined into a single module or further subdivided into additional modules such as an encoder, encrypter, modulator.

It should be noted that the receipt of data is not shown or described because it is unaffected by the method of the present invention. Data is, of course, received and processed by the AP and stations that are members of the network but the present invention is directed to a method and apparatus for gaining access to a communication medium in a contention-based network in order to initiate frame transmission.

The deterministic backoff method of the present invention handles the issue of medium access in a totally different manner than traditional CSMA/CA approaches. In CSMA/CA, a random backoff method is used to avoid collisions, while the method of the present invention reduces or eliminates collisions by deterministically assigning a value to the slot counter. The two solutions are incompatible. A station using a random backoff method cannot work within a network using deterministic backoff as its medium access method.

The AP informs the potential new joiner which algorithm the network uses for medium access. A legacy station that only supports a random backoff method should withdraw its association request once it determines that the network is running a deterministic backoff method. Only requests from those stations that support the deterministic backoff method should be accepted by the AP in this situation.

The relationship between the two algorithms is similar to that of the TDMA (time division multiple access) and CSMA (carrier sense multiple access): they are exclusive and only one of them can exist within a network. However, it should be noted that the method of the present invention still falls into the category of CSMA, as 1) its operations are based on the carrier sensing mechanism provided by the low-level physical layer, and 2) the AP does not control time scheduling as in TDMA. In fact, there is no time scheduling in method of the present invention rather transmission opportunities are gained by stations in a round robin manner.

The round robin service provided by the deterministic backoff method guarantees the fairness for medium access among stations. Each station has an opportunity to complete a frame transaction in each service round. Moreover, if a time limit is imposed on the time length for each transmission opportunity, denoted as TxopLimit, then the service interval can be bounded to $((m-1)\cdot(TxopLimit+DIFS)+DIFS)$, with m being the number of stations in the network. Thus, with carefully chosen TxopLimit and appropriate control of the network's size, it is possible to provide guaranteed QoS for network applications.

In an alternative embodiment already described above, a simple priority scheme can be implemented by increasing the number of stations and inserting stations with higher priority traffic/data into the address queue multiple times. This, of course, impacts the overall fairness of the deterministic backoff method of the present invention but may be advantageous in some cases.

Network collisions are an annoying issue for the CSMA based wireless communications, as collisions greatly degenerate network performance, particularly in terms of throughput and network efficiency. However, collisions are eliminated (or greatly reduced) in the deterministic backoff method of the present invention. Each station can exclusively take control of the wireless medium after its slot count reaches zero. In this sense, the deterministic backoff method of the present invention outperforms legacy random backoff methods.

Another advantage of the deterministic backoff method of the present invention is that the network efficiency is extremely high assuming that each station has pending data to send when it gets control of the channel. In this situation, the time interval between two successive transmission opportunities is only one DIFS time period/interval plus one slot time, about 70 µs for IEEE 802.11b and an even shorter time for IEEE 802.11a and IEEE 802.11g. Thus, the ratio of the idle period to the busy period is low, and the network efficiency is high. In such a saturated network, the network behavior is similar to that of TDMA networks.

It is to be understood that the present invention may be implemented in various forms of hardware (e.g. ASIC chip), software, firmware, special purpose processors, or a combination thereof, for example, within a server, an intermediate device (such as a wireless access point or a wireless router) or mobile device. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementation or configurations of the present invention.

The invention claimed is:

1. A method for gaining access to a communication medium in a contention-based network, said method comprising:
   determining a slot count based on a number of stations in said contention-based network;
   adjusting said slot count;
   initiating a frame transmission when said slot count reaches a predetermined value; and
   calibrating said slot count upon completion of said frame transmission.

2. The method according to claim 1, wherein said stations in said contention-based network share said communication medium.

3. The method according to claim 1, further comprising receiving a request to join said contention-based network.

4. The method according to claim 3, further comprising sending information regarding the communication medium access method used by said contention-based network, said number of stations, said slot count and an address queue.

5. The method according to claim 4, further comprising receiving an acknowledgment.

6. The method according to claim 4, further comprising receiving a dissociation message.

7. A method for gaining access to a communication medium in a contention-based network, said method comprising:
   receiving a slot count based on a number of stations in said contention-based network;
   adjusting said slot count;
   initiating a frame transmission when said slot count reaches a predetermined value; and
   calibrating said slot count upon completion of said frame transmission.

8. The method according to claim 7, wherein said stations in said contention-based network share said communication medium.

9. The method according to claim 7, further comprising sending a request to join said contention-based network.

10. The method according to claim 9, further comprising receiving information regarding the communication medium access method used by said contention-based network, said number of stations, said slot count and an address queue.

11. The method according to claim 10, further comprising sending an acknowledgment.

12. The method according to claim 10, further comprising sending a dissociation message.

* * * * *